(12) United States Patent
Misumi

(10) Patent No.: US 12,386,349 B2
(45) Date of Patent: Aug. 12, 2025

(54) AUTOMATIC DETERMINATION OF MOORING DIRECTION OF BOAT

(71) Applicant: Honda Motor Co., Ltd., Tokyo (JP)

(72) Inventor: Yoshiyuki Misumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 17/964,917

(22) Filed: Oct. 13, 2022

(65) Prior Publication Data

US 2024/0126262 A1 Apr. 18, 2024

(51) Int. Cl.
| | |
|---|---|
| *G05D 1/249* | (2024.01) |
| *B63B 49/00* | (2006.01) |
| *G01S 17/89* | (2020.01) |
| *G01S 17/93* | (2020.01) |
| *G05D 1/00* | (2006.01) |
| *G05D 1/661* | (2024.01) |
| *G06V 20/05* | (2022.01) |
| *G06V 20/13* | (2022.01) |
| *G06V 20/17* | (2022.01) |
| *G06V 20/56* | (2022.01) |
| *G08G 3/00* | (2006.01) |
| *G08G 3/02* | (2006.01) |

(52) U.S. Cl.
CPC .......... *G05D 1/0208* (2013.01); *B63B 49/00* (2013.01); *G01S 17/89* (2013.01); *G06V 20/05* (2022.01); *G06V 20/13* (2022.01); *G06V 20/17* (2022.01); *G06V 20/56* (2022.01); *G08G 3/02* (2013.01)

(58) Field of Classification Search
CPC ...... G05D 1/0208; G06V 20/17; G06V 20/05; G06V 20/56; G06V 20/13; B63B 49/00; G01S 17/89; G08G 3/02
See application file for complete search history.

(56) References Cited

U.S. PATENT DOCUMENTS

| | | | | |
|---|---|---|---|---|
| 2021/0094659 | A1* | 4/2021 | Akuzawa | ................ B63B 79/15 |
| 2022/0291688 | A1* | 9/2022 | Afman | ................ G05D 1/0206 |
| 2024/0296737 | A1* | 9/2024 | Zhou | ........................ G08G 1/14 |

FOREIGN PATENT DOCUMENTS

| | | |
|---|---|---|
| JP | 6661708 | 3/2020 |
| JP | 7044018 | 3/2022 |

* cited by examiner

*Primary Examiner* — Scott A Browne
*Assistant Examiner* — Rami Nabih Bedewi
(74) *Attorney, Agent, or Firm* — JCIPRNET

(57) ABSTRACT

A system for automatically determining a mooring direction or a berth approach direction of a boat. The system including a control unit including a processor. The control unit is configured to obtain image information, the image information including information of an other boat that is moored; identify a mooring direction of the other boat based on the image information; determine the mooring direction or the berth approach direction of the boat based on the mooring direction of the other boat, wherein the control unit determines an automatic mooring route of the boat based on the mooring direction or the berth approach direction of the boat, and the control unit outputs a control signal for controlling an automatic mooring of the boat.

14 Claims, 9 Drawing Sheets

Flat Stern

AUTOMATIC DETERMINATION OF MOORING DIRECTION OF BOAT

BACKGROUND OF THE DISCLOSURE

Technical Field

The disclosure relates to mooring of a boat, and more specifically relates to automatic recognition of a mooring direction of the boat.

Related Art

Conventionally, when a boat is to be autonomously moored at a port or a harbor, a user must set a mooring direction of the boat via, for example, an HMI screen. Furthermore, a pier may have, for example, an I-shape or a U-shape or the like. The user may need to set the boat to be horizontally moored or vertically moored in addition to setting the mooring direction.

Therefore, a way for automatically determining the mooring direction of the boat is needed.

SUMMARY

According to an embodiment of the disclosure, a system for automatically determining a mooring direction or a berth approach direction of a boat is provided. The system including a control unit including a processor. The control unit is configured to obtain image information, the image information including information of an other boat that is moored; identify a mooring direction of the other boat based on the image information; determine the mooring direction or the berth approach direction of the boat based on the mooring direction of the other boat, wherein the control unit determines an automatic mooring route of the boat based on the mooring direction or the berth approach direction of the boat, and the control unit outputs a control signal for controlling an automatic mooring of the boat.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figures 1, 2:
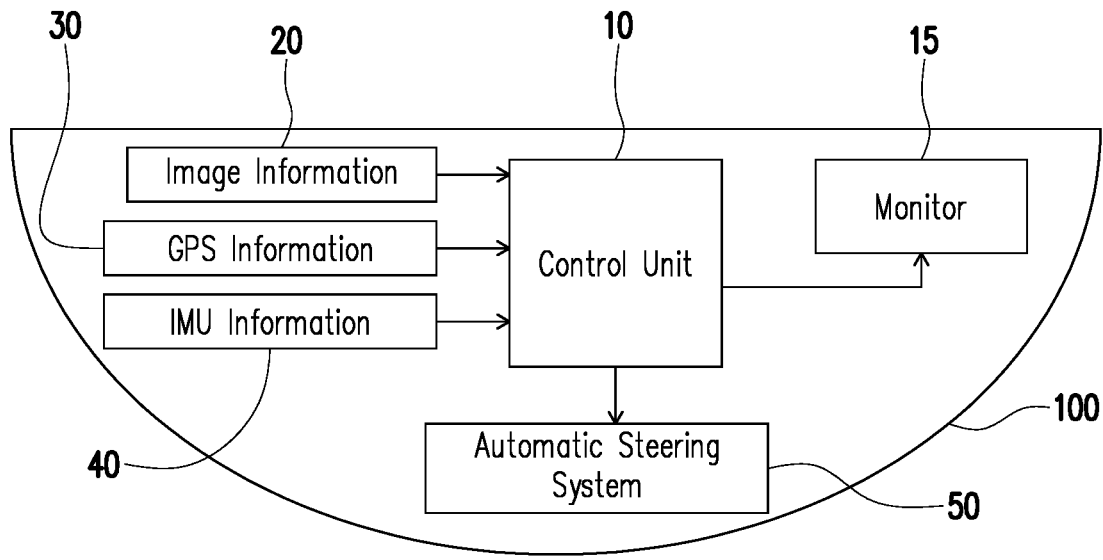
FIG. 1 is a schematic diagram illustrating a system for automatically determining a mooring direction of a boat according to an embodiment of the disclosure.
FIG. 2 is a schematic diagram illustrating some examples of image information according to an embodiment of the disclosure.

FIG. 1 is a schematic diagram illustrating a system for automatically determining a mooring direction of a boat according to an embodiment of the disclosure. Referring to FIG. 1, a boat 100 is provided. The boat 100 may be, for example, a water vessel, a water craft, a ship and/or the like. The boat 100 includes a propulsion system, for example, a motor for propelling the boat 100 in water. The motor may be, for example, an inboard motor, an outboard motor, a partially inboard-partially outboard motor and the like. A propeller is coupled to an output shaft of the motor. The boat 100 includes a steering system, for example, a steering wheel coupled to a rudder to steer a direction of the boat 100. The steering wheel may be coupled to the rudder by, for example, a cable or a wire or the like.

The boat 100 includes a control unit 10. The control unit 10 includes, for example, a processor and a memory. The boat 100 includes a manual driving mode and an automatic driving mode. More specifically, the boat 100 includes an automatic steering system 50 for automatically driving the boat. The control unit 10 is coupled to the automatic steering system 50, wherein the control unit 10 outputs (sends/transmits) control signals to the automatic steering system 50 to automatically drive the boat 100. In more detail, the control unit 10 controls an automatic mooring of the boat 100 via the automatic steering system 50. The control unit 10 may also determine an automatic mooring route of the boat 100.

The automatic steering system 50 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor may be used for detecting objects in a surrounding of the boat 100.

Referring to FIG. 1, the control unit 10 receives image information 20, GPS information 30 and IMU information 40. More specifically, the boat 100 includes a GPS for obtaining the GPS information 30. The GPS is an example of a Global Navigation Satellite System (GNSS). In addition, the boat 100 includes an inertial measurement unit (IMU) for obtaining the IMU information 40. The IMU may include, for example, control moment gyros to provide orientation information such as pitch, roll, yaw information of the boat 100.

FIG. 2 is a schematic diagram illustrating some examples of image information according to an embodiment of the disclosure. Referring to FIG. 2, the image information 20 may be, for example, a lidar image, an aerial drone image, an underwater drone image, a satellite image, a cameral image and/or the like. The image information 20 may be an image that is obtained in real time or an image that is stored in a memory. For example, the image information 20 may be obtained in real time from the lidar, the underwater drone, the aerial drone, the camera on the boat 100, the camera on satellite and/or the like. In another embodiment, the image information 20 may be obtained in from an image stored in memory, such as images from the lidar, the underwater drone, the aerial drone, the camera on the boat 100, the camera on satellite and/or the like that are store in a memory. The above examples of the image information 20 are described as examples only and are not intended to limit the disclosure.

Lidar is an acronym for "light detection and ranging" or "laser imaging, detection, and ranging". The boat 100 may include the lidar for obtaining the lidar image. The boat 100 may include a camera having an image sensor for obtaining the camera image. The aerial drone image may be obtained from an aerial drone carrying a camera. The underwater drone image may be obtained from an underwater drone carrying a camera. The satellite image may be obtained from a satellite carrying a camera.

Referring to FIG. 1, a monitor 15 is disposed on the boat 10. The monitor 15 is an example of a display unit. The monitor 15 includes a display for displaying an image. The monitor 15 is coupled to the control unit 10.

Figure 3:
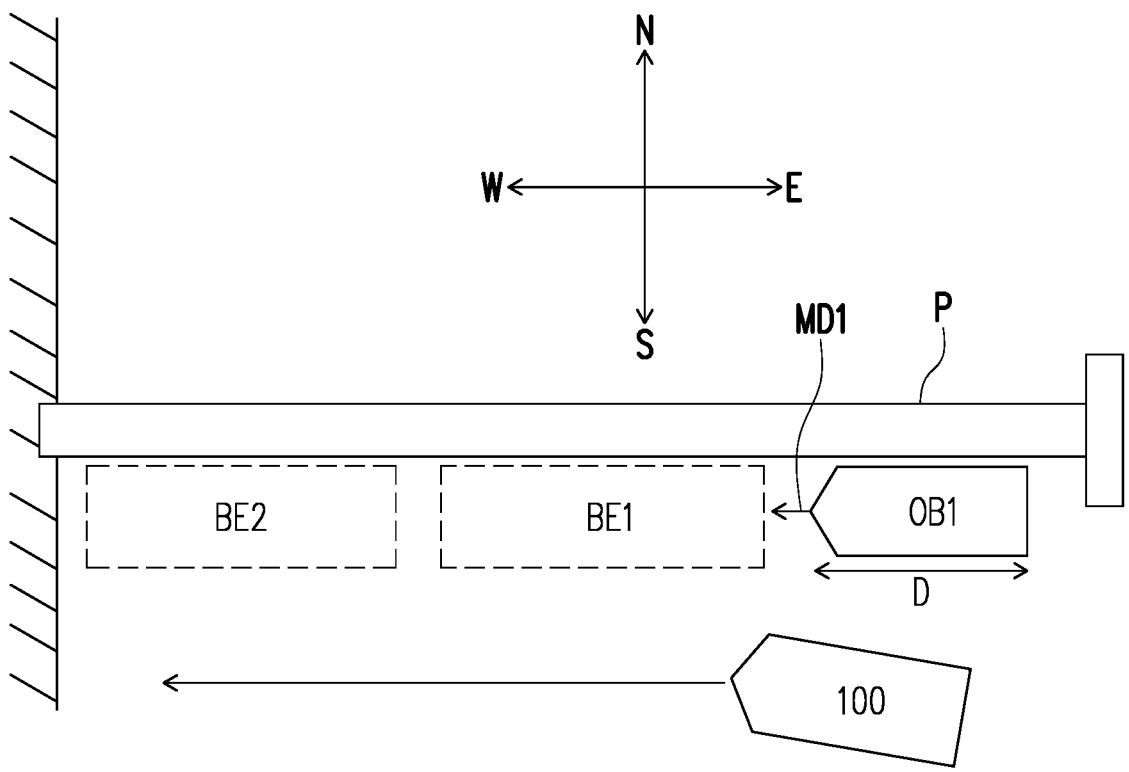
FIG. 3 is a schematic diagram illustrating an I-shape pier according to an embodiment of the disclosure.

FIG. 3 is a schematic diagram illustrating an I-shape pier according to an embodiment of the disclosure. Referring to FIG. 3, the boat 100 including the control unit 10 is configured to obtain the image information 20, wherein the image information 20 includes information of a first other boat OB1 that is moored. For example, the control unit 10 may determine the first other boat OB1 is moored by, for example, a position change of the first other boat OB1 over time. For example, if a position change of the first other boat OB1 does not exceed a predetermined position change of, for example, 1 meter, over a predetermine period of time, then the control unit 10 may determine the first other boat OB1 is moored. The predetermined position change threshold is not limited thereto and may be set according to requirements. In another embodiment, the control unit 10 may determine the first other boat OB1 is moored if a distance between the first other boat OB1 and a pier P is less than a predetermined distance of, for example, 1 meter. The predetermined distance is not limited thereto and may be set according to requirements.

Referring to FIG. 3, the control unit 10 is configured to identify a first mooring direction MD1 of the first other boat OB1. In the present embodiment, a direction in which a bow of the first other boat OB1 points toward is set as the first mooring direction MD1. However, the disclosure is not limited thereto. In another embodiment of the disclosure, a direction in which a stern of the first other boat OB1 points toward may be set as the first mooring direction MD1. In another embodiment of the disclosure, a direction in which a port side of the first other boat OB1 points toward may be set as the first mooring direction MD1. In another embodiment of the disclosure, a direction in which a starboard side of the first other boat OB1 points toward may be set as the first mooring direction MD1.

The control unit 10 is configured to identify a berth for mooring the boat 100. More specifically, the control unit 10 may identify a first berth BE1 for mooring the boat 10 to the pier P, based on the image information 20. In addition, the control unit 10 may identify a first berth BE1 and a second berth BE2 for mooring the boat 10 to the pier P, based on the image information 20. That is to say, the control unit 10 may identify a berth that is not occupied by other boats from the image information 20. A number of the open berths for mooring the boat 100 identified by the control unit 10 is not intended to limit the disclosure.

Figure 4:
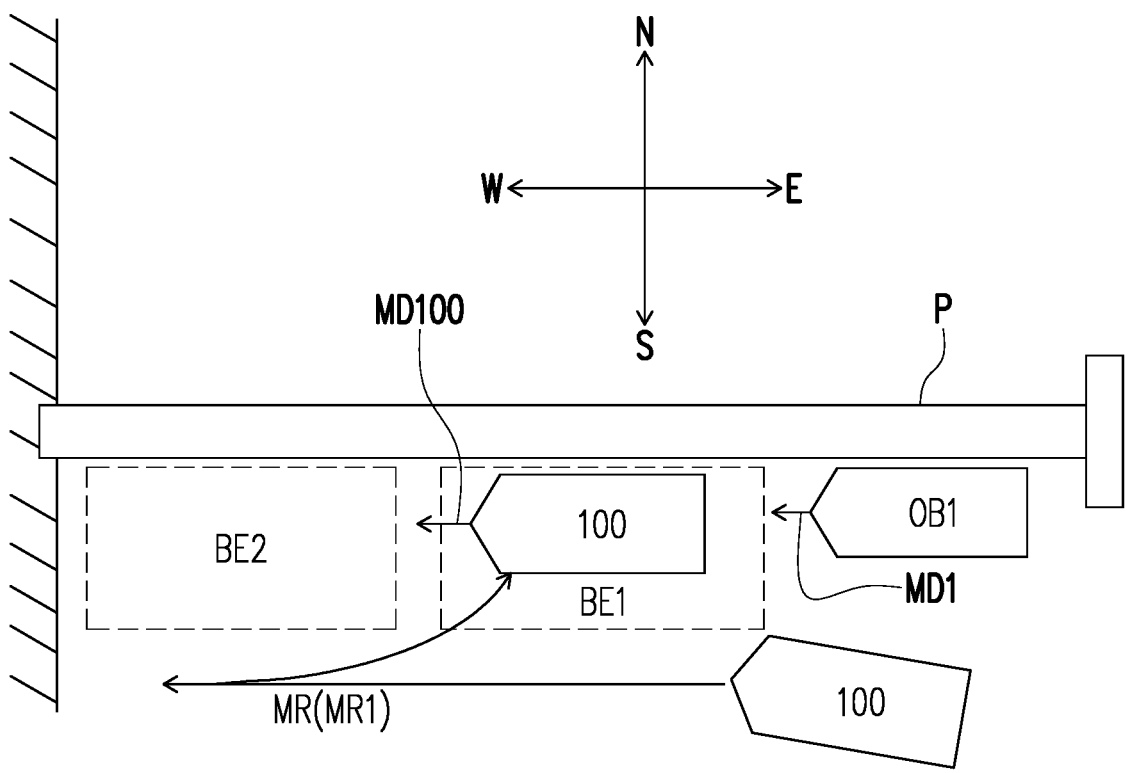
FIG. 4 is a schematic diagram illustrating a mooring of a boat according to an embodiment of the disclosure.

FIG. 4 is a schematic diagram illustrating a mooring of a boat according to an embodiment of the disclosure. Referring to FIG. 4, the boat 100 is horizontally moored to the pier P at the first berth BE1. The control unit 10 determines the mooring direction MD100 of the boat 100 based on the first mooring direction MD1 of the first other boat OB1. In the present embodiment, the mooring direction MD100 of the boat 100 refers to a pointing direction of the bow of boat 100 when the boat 100 is moored at the berth.

Referring to FIG. 4, since the control unit 10 identifies that the first mooring direction MD1 of the first other boat OB1 is facing West, then the control unit 10 determines the mooring direction MD100 of the boat 100 should also be facing West. In this way, the control unit 10 sets the mooring direction MD100 of the boat 100 to be a same direction as the first mooring direction MD1 of the other boat OB1.

Referring to FIG. 4, the control unit 10 calculates and/or sets an automatic mooring route MR of the boat 100 based on the mooring direction M100 of the boat 100. More specifically, the control unit 10 calculates and/or sets a first automatic mooring route MR1 of the boat 100 based on the mooring direction M100 of the boat 100 that is determined by the control unit 10. The mooring direction M100 of the boat 100, and/or the first automatic mooring route MR1 of the boat 100 such as shown in FIG. 4 may be displayed on the monitor 15.

Figure 5:
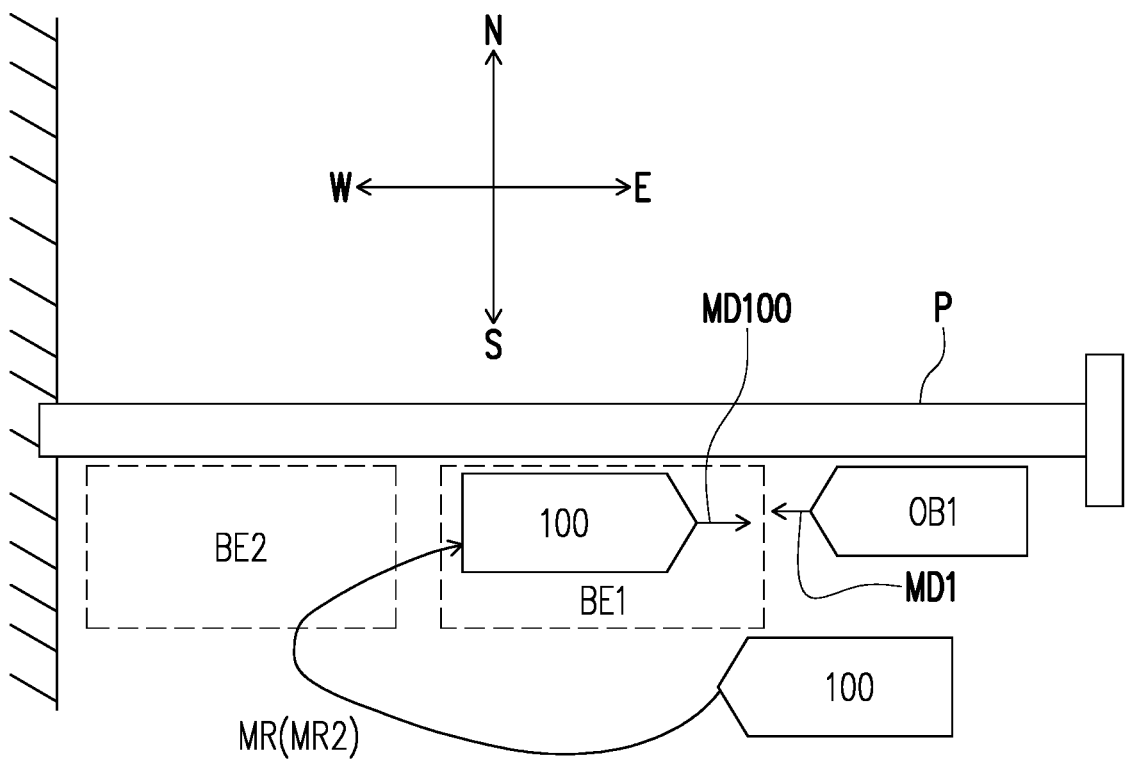
FIG. 5 is a schematic diagram illustrating a mooring of a boat according to an embodiment of the disclosure.

FIG. 5 is a schematic diagram illustrating a mooring of a boat according to an embodiment of the disclosure. Referring to FIG. 5, the boat 100 is horizontally moored to the pier P at the first berth BE1. A difference between the embodiment in FIG. 5 and the embodiment of FIG. 4, is that the control unit 10 determines the mooring direction MD100 of the boat 100 is a different direction from the first mooring direction MD1 of the first other boat OB1, instead of the same direction. More specifically, in the embodiment of FIG. 5, the control unit 10 determines the mooring direction MD100 of the boat 100 is opposite to the first mooring direction MD1 of the first other boat OB1.

Referring to FIG. 5, since the control unit 10 identifies that the first mooring direction MD1 of the first other boat OB1 is facing West, then the control unit 10 determines the mooring direction MD100 of the boat 100 should be facing East. In this way, the control unit 10 sets the mooring direction MD100 of the boat 100 to be an opposite direction to the first mooring direction MD1 of the other boat OB1.

Referring to FIG. 5, the control unit 10 calculates and/or sets an automatic mooring route MR of the boat 100 based on the mooring direction M100 of the boat 100. More specifically, the control unit 10 calculates and/or sets a second automatic mooring route MR2 of the boat 100 based on the mooring direction M100 of the boat 100 that is determined by the control unit 10. The mooring direction M100 of the boat 100, and/or the second automatic mooring route MR2 of the boat 100 such as shown in FIG. 5 may be displayed on the monitor 15.

Referring to FIG. 1, the control unit 10 may be configured to receive an input from a user via an input unit. The input unit may include, for example, a computer mouse and/or a keyboard. In another embodiment, the monitor 15 may include, for example, a capacitive touch screen to act as a touch screen to receive input from the user. In the present embodiment, the mooring direction MD100 of the boat 100, and/or the automatic mooring route MR of the boat 100 may be changed via the input unit. For example, the mooring direction MD100 of the boat 100 may be changed from the West direction shown in FIG. 4 to the East direction shown in FIG. 5 via the input unit. In another embodiment of the disclosure, the mooring direction MD100 of the boat 100 may be changed from the East direction shown in FIG. 5 to the West direction shown in FIG. 4.

As described above, in an embodiment of the disclosure, the control unit 10 may set the mooring direction MD100 of the boat 100 in a same direction as the first mooring direction MD1 of the other boat OB1. In another embodiment of the disclosure, the control unit 10 may set the mooring direction MD100 of the boat 100 in a different direction as the first mooring direction MD1 of the other boat OB1. In another embodiment of the disclosure, the control unit 10 may set the mooring direction MD100 of the boat 100 in an opposite direction as the first mooring direction MD1 of the other boat OB1. In another embodiment of the disclosure, the control unit 10 may set the mooring direction MD100 of the boat 100 in an orthogonal direction to the first mooring direction MD1 of the other boat OB1. In another embodiment of the disclosure, the control unit 10 may set the mooring direction MD100 of the boat 100 to form an acute angle or an obtuse angle with the first mooring direction MD1 of the other boat OB1.

Figure 6:
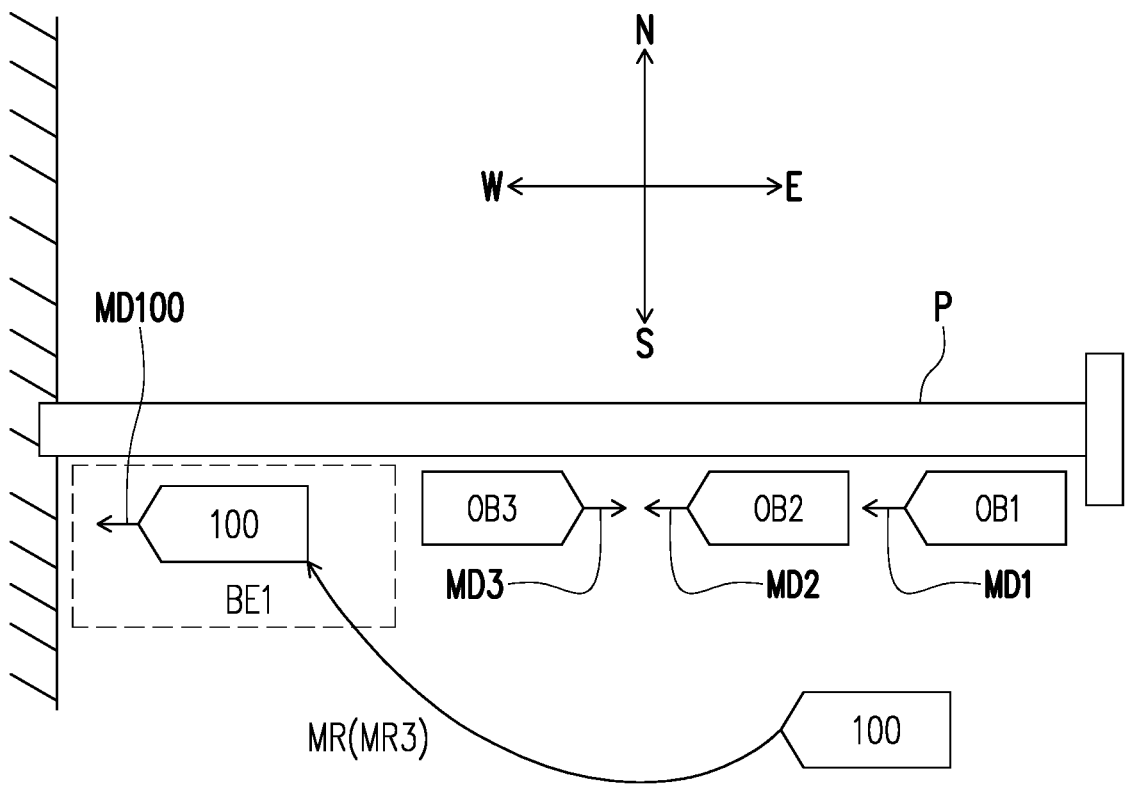
FIG. 6 is a schematic diagram illustrating a mooring of a boat according to a plurality of other boats.

FIG. 6 is a schematic diagram illustrating a mooring of a boat according to a plurality of other boats. Referring to FIG. 6, the image information 20 may include information of a plurality of other boats OB that are moored. The image information 20 may include, for example, information of a first other boat OB1, a second other boat OB2 and a third other boat OB3. The control unit 10 identifies a plurality of mooring directions MD1, MD2, MD3 of the plurality of other boats OB1, OB2, OB3 respectively, based on the image information 20.

Referring to FIG. 6, the control unit 10 identifies the first mooring direction MD1 of the first other boat OB1 as, for example, West. The control unit 10 identifies the second mooring direction MD2 of the second other boat OB2 as, for example, West. The control unit 10 identifies the third mooring direction MD3 of the third other boat OB3 as, for example, East.

Next, the control unit 10 tallies the plurality of mooring directions MD1, MD2, MD3 of the plurality of other boats OB1, OB2, OB3. More specifically, the control unit 10 counts how many times a direction is identified. In the example embodiment of FIG. 6, the control unit 10 determines that the direction West is identified/counted twice (by the first mooring direction MD1 and the second mooring direction MD2 facing West), while the control unit 10 tallies that the direction East is counted once (by the third mooring direction MD3 facing East).

Referring to FIG. 6, one mooring direction (West) among the plurality of mooring directions (West and East) of the other boats (OB1, OB2, OB3) having a highest number of counts is determined as the mooring direction MD100 of the boat 100. Since the number of other boats OB facing West is greater than the number of other boats OB facing East, the mooring direction MD100 of the boat 100 is set to West by the control unit 10. That is to say, the control unit 10 sets the mooring direction MD100 of the boat 100 to be in the same direction as the mooring direction MD of a majority of the other boats OB.

In another embodiment of the disclosure, one mooring direction (East) among the plurality of mooring directions (West and East) of the other boats (OB1, OB2, OB3) having a lowest number of counts may be determined as the mooring direction MD of the boat 100, instead of a highest number of counts. For example, if the number of other boats facing East is less than the number of other boats facing West, the mooring direction MD100 of the boat 100 may be set to East by the control unit 10. That is to say, the control unit 10 sets the mooring direction MD100 of the boat 100 to be in the opposite direction as the mooring direction MD of a majority of the other boats OB. In other words, the control unit 10 sets the mooring direction MD100 of the boat 100 to be in the same direction as the mooring direction MD of a minority of the other boats OB.

Next, some examples of how the control unit 10 identifies the mooring direction MD1 of the other boat OB1 will be described using FIG. 7A-FIG. 9B.

Figure 7A:
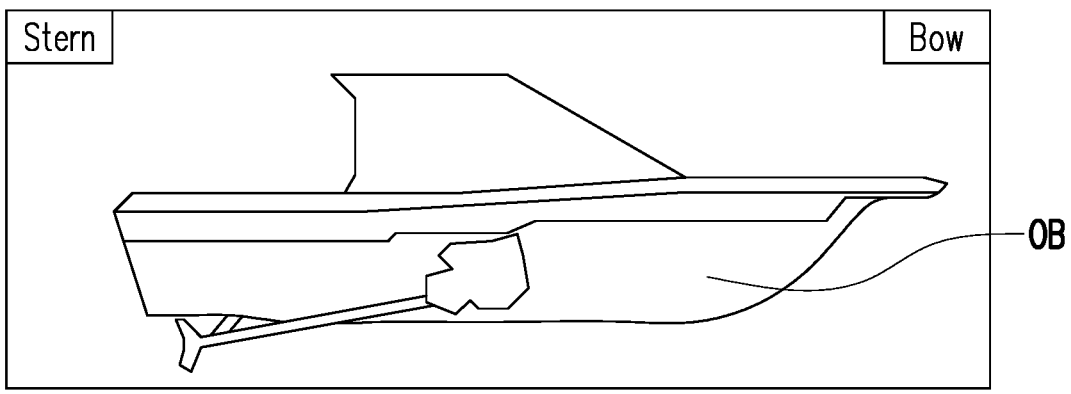
FIG. 7A-7C are schematic diagrams illustrating examples of determining a mooring direction of an other boat based on a location of the motor and/or propeller according to an embodiment of the disclosure.
Figure 7B:
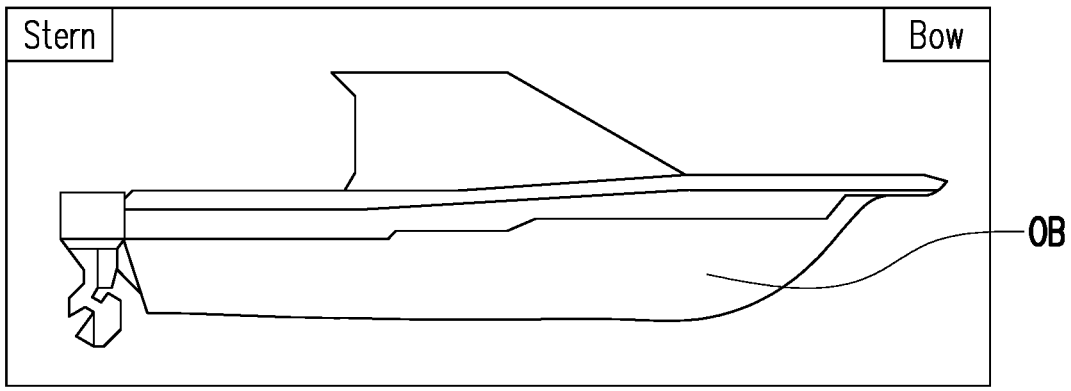
Figure 7C:
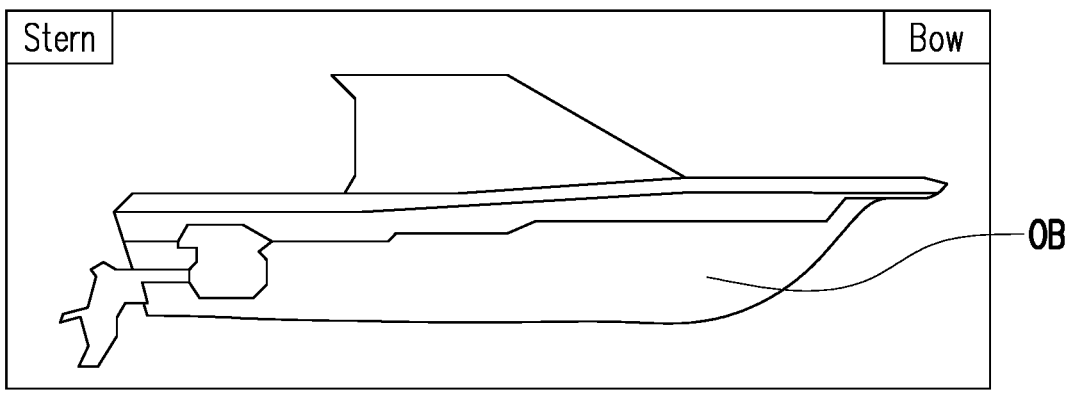

FIG. 7A-7C are schematic diagrams illustrating examples of determining a mooring direction of an other boat based on a location of the motor and/or propeller according to an embodiment of the disclosure. FIG. 7A shows a schematic side view of the other boat OB having an inboard motor. FIG. 7B shows a schematic side view of the other boat OB having an outboard. FIG. 7C shows a schematic side view of the other boat OB having a partially inboard and partially outboard motor. Referring to FIGS. 7A, 7B and 7C, the control unit 10 may identify a location of the propeller and/or a location of the motor on the other boat OB from the side view of the other boat OB obtained from the image information 20. In more detail, the control unit 10 may determine a side of the other boat OB in which the motor and/or the propeller is disposed on is the stern of the other boat OB. Furthermore, the control unit 10 may determine another side of the other boat OB in which the motor and/or the propeller is not disposed on is the bow of the other boat OB. In the present embodiment, the direction in which the bow points towards is determined as the mooring direction of the other boat OB. That is to say, the mooring direction of the other boat OB is determined based on the bow information of the other boat OB. In an embodiment of the disclosure, the mooring direction of the other boat OB is determined based on a location of an outboard of the other boat.

Figure 8A:
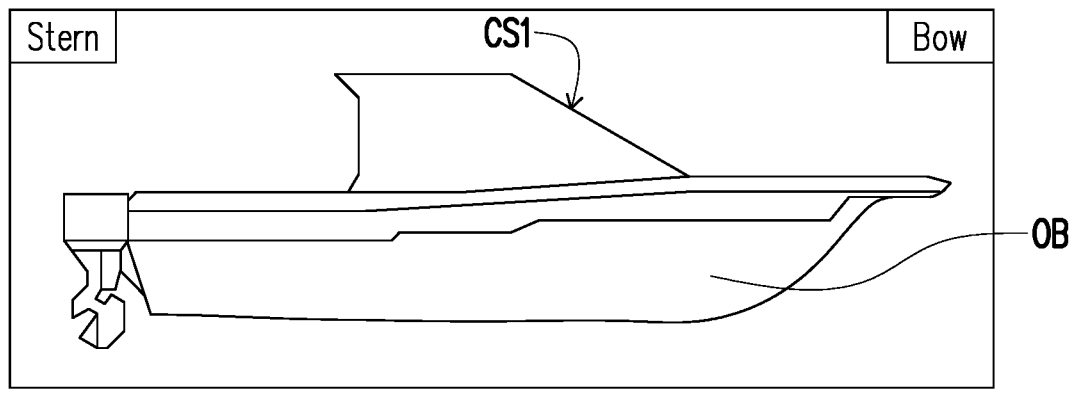
FIG. 8A-8B are schematic diagrams illustrating examples of determining a mooring direction of an other boat based on a cabin shape of according to an embodiment of the disclosure.
Figure 8B:
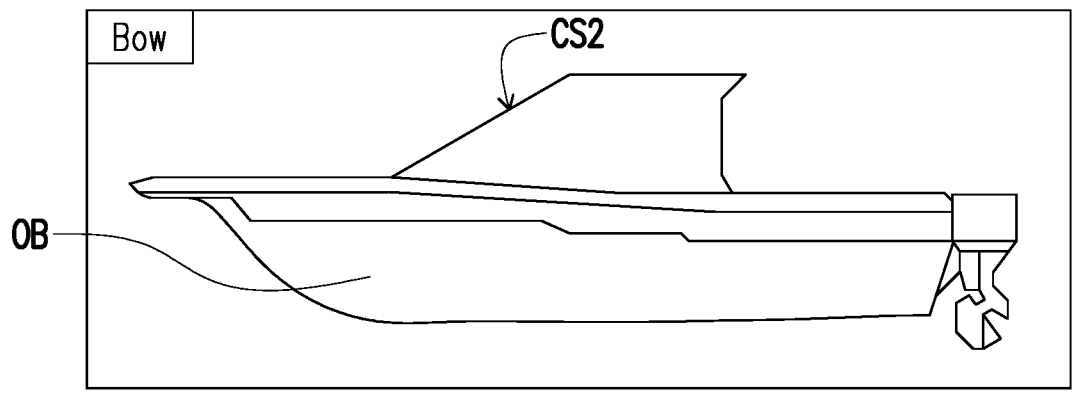

FIG. 8A-8B are schematic diagrams illustrating examples of determining a mooring direction of an other boat based on a cabin shape according to an embodiment of the disclosure. FIG. 8A shows a schematic side view of the other boat OB facing, for example, East. FIG. 8B shows a schematic side view of the other boat OB facing, for example, West. Referring to FIGS. 8A and 8B, the control unit 10 may identify a cabin shape CS1, CS2 of the other boat OB from the side view of the other boat OB obtained from the image information 20. In more detail, the control unit 10 may determine the bow of the other boat OB based on a taper of the direction of the cabin shape CS1, CS2. For example, the control unit 10 may determine a side in which the cabin tapers narrower as the bow of the other boat OB. Furthermore, the control unit 10 may determine a side in which the cabin tapers wider as the stern of the other boat OB. In the present embodiment, the direction in which the bow points towards is determined as the mooring direction of the other boat OB. That is to say, the mooring direction of the other boat OB is determined based on a cabin shape of the other boat OB.

Figure 9A:
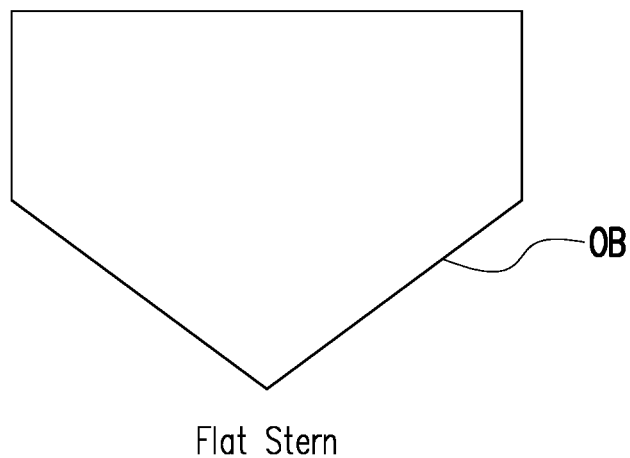
FIG. 9A-9B are schematic diagrams illustrating examples of determining a mooring direction of an other boat based on a shape of a stern or bow according to an embodiment of the disclosure.
Figure 9B:
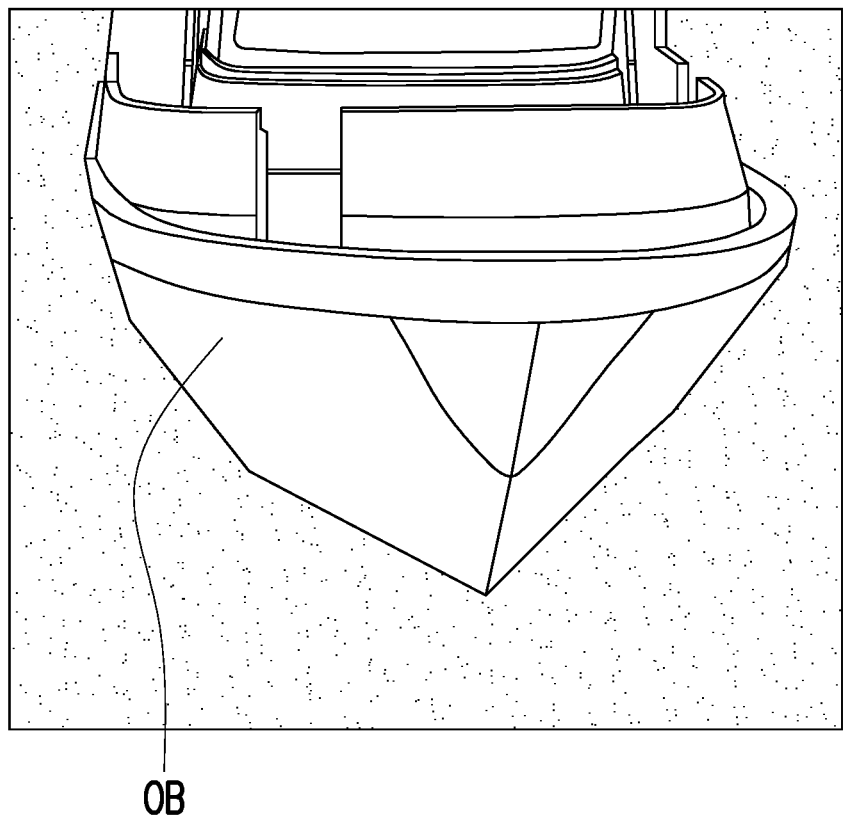

FIG. 9A-9B are schematic diagrams illustrating examples of determining a mooring direction of an other boat based on a shape of a stern or bow according to an embodiment of the disclosure. FIG. 9A shows a schematic rear view of the other boat OB. FIG. 9B shows a schematic front view of the other boat OB. Referring to FIGS. 9A and 9B, the control unit 10 may identify the stern or the bow of the other boat OB from the rear view or front view the other boat OB obtained from the image information 20. More specifically, the control unit 10 may differentiate the bow of the other boat OB from the stern of the other boat OB based on the shape. For example, the stern may be relatively flat compared to the bow of the other boat OB. For example, the bow may be tapered narrower toward a front tip of the boat while the stern is relatively flat with no taper. In the present embodiment, the direction in which the bow points towards is determined as the mooring direction of the other boat OB. That is to say, the mooring direction of the other boat OB is determined based on a shape of the stern or a shape of the bow of the other boat OB.

Referring to FIG. 1, the mooring direction MD1 of the other boat OB1 may be determined based on a dimension D of the other boat OB1. In more detail, in the image information 20 obtained by the control unit 10, if the dimension D of the other boat OB1 in a first direction is greater than a predetermined dimension of, for example, 25 feet (approximately 7.62 meters), then the control unit 10 may determine that the dimension in the first direction greater than 25 feet is a "length" direction of the other boat, and the first direction is not a "width" direction of the other boat. Conventionally, a pleasure boat having a length of 25 feet are known, however a pleasure boat having a width of 25 feet are not known (or may be rare). Accordingly, the control unit 10 may determine the mooring direction MD1 of the other boat OB1 based on a length dimension of the other boat. The predetermined dimension is not limited thereto and may be set according to requirements.

In another embodiment of the disclosure, the control unit 10 may determine a bow direction and/or a stern direction of the boat from a top view of the boat based on, for example, a taper shape of the bow. For example, the control unit 10 may determine the mooring direction of the boat from a top view such as the satellite image.

Some examples of how the control unit 10 may identify the mooring direction MD of the other boats OB was described above. However, the disclosure is not limited thereto.

Figure 10:
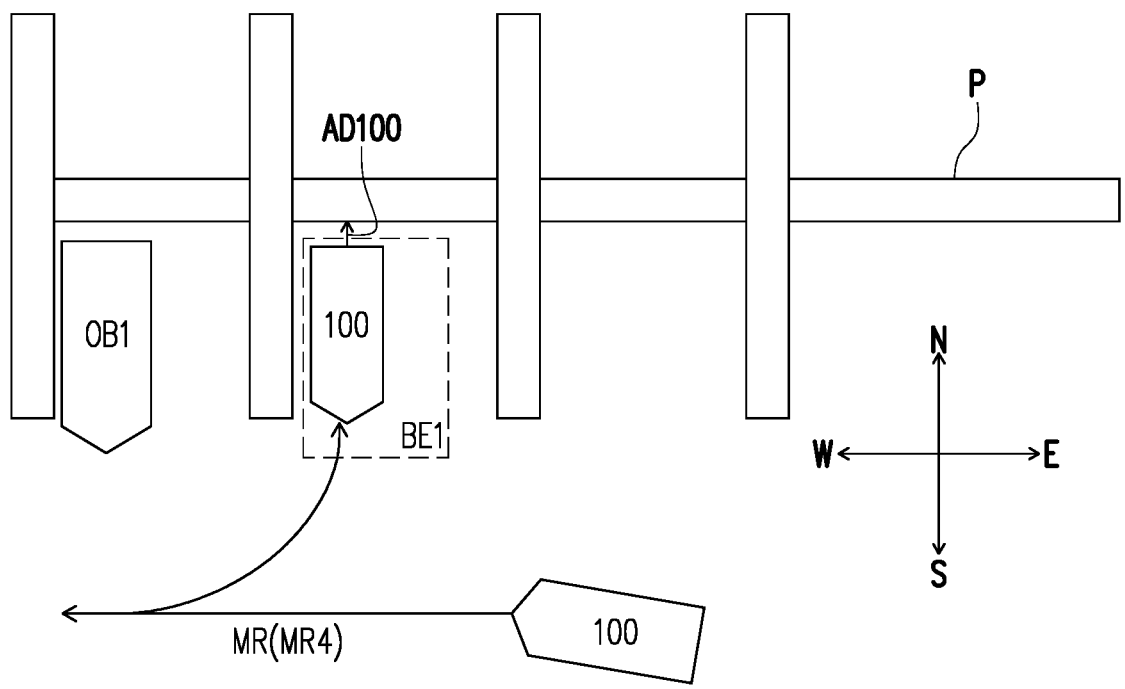
FIG. 10 is a schematic diagram illustrating an H-shape pier wherein a boat is vertically moored in a first direction according to an embodiment of the disclosure.
Figure 11:
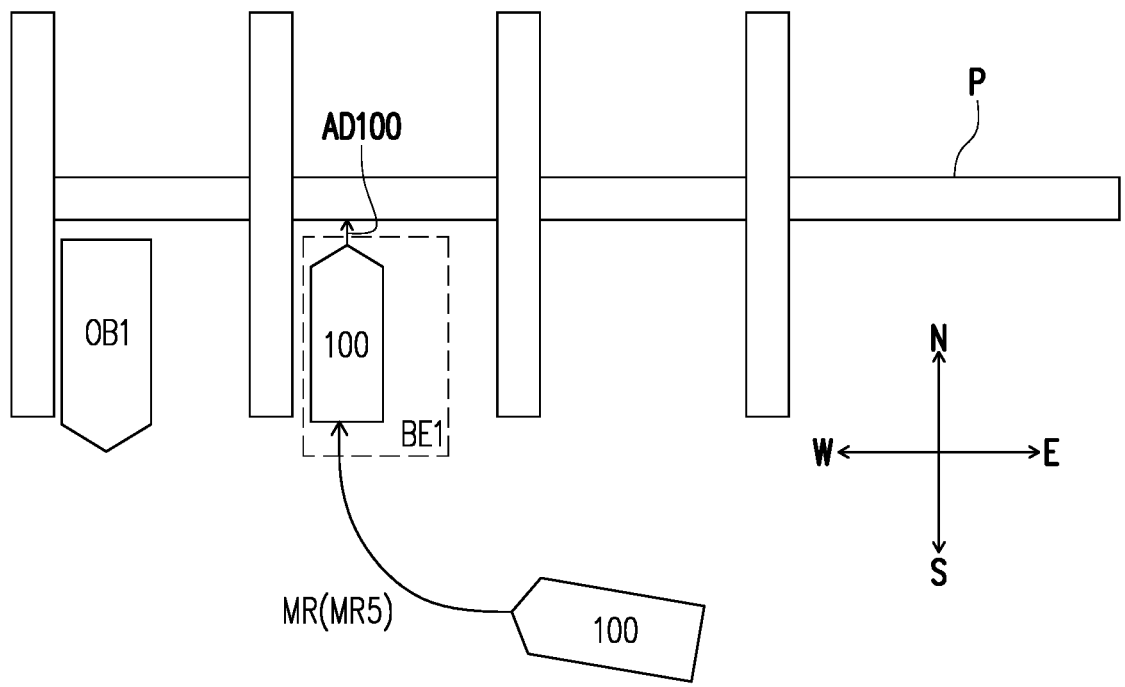
FIG. 11 is a schematic diagram illustrating an H-shape pier wherein a boat is vertically moored in a second direction according to an embodiment of the disclosure.

FIG. 10 is a schematic diagram illustrating an H-shape pier wherein a boat is vertically moored in a first direction according to an embodiment of the disclosure. FIG. 11 is a schematic diagram illustrating an H-shape pier wherein a boat is vertically moored in a second direction according to an embodiment of the disclosure. Referring to FIG. 10 and FIG. 11, when the control unit 10 identifies the first berth BE1 based on the image information 20, the control unit 10 may determine whether a berth approach direction AD100 of the boat 100 is bow first or stern first. More specifically, the control unit 10 is configured to determine the berth approach direction AD100 of the boat 100 based on the shape of the pier H, and the mooring direction MD1 of the of other boat OB1.

In an embodiment of the disclosure, prior to determining the berth approach direction AD100 of the boat 100, the control unit 10 may estimate a berth approach direction AD1 of the first other boat OB1. That is to say, the control unit 10 may determine whether the berth approach direction AD1 of the first other boat OB1 is stern first or bow first based on the image information 20. In more detail, based on the shape of the pier H and the fact that the mooring direction MD1 of the first other boat OB1 is facing South, the control unit 10 may estimate that the berth approach direction AD1 of the first other boat OB1 is stern first. In other words, the berth approach direction AD1 of the first other boat OB1 may be estimated from the shape of the pier H and the mooring direction MD1 of the first other boat OB1.

Referring to FIG. 10, after the control unit 10 determines the berth approach direction AD1 of the first other boat OB1, the control unit 10 may set the berth approach direction AD100 of the boat 100 to be a same berth approach direction as the berth approach direction AD1 of the first other boat OB1, namely rear first (stern first).

Referring to FIG. 11, after the control unit 10 determines the berth approach direction AD1 of the first other boat OB1, the control unit 10 may set the berth approach direction AD100 of the boat 100 to be an opposite berth approach direction as the berth approach direction AD1 of the first other boat OB1, namely front first (bow first).

Figure 12:
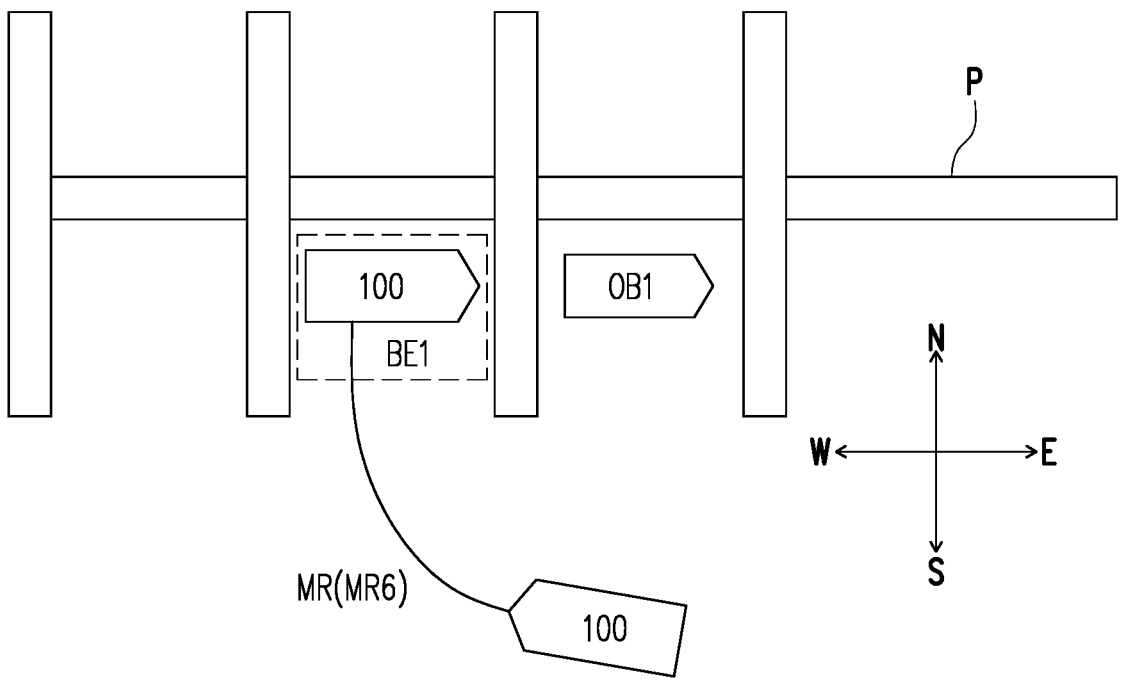
FIG. 12 is a schematic diagram illustrating an H-shape pier wherein a boat is horizontally moored in a first direction according to an embodiment of the disclosure.
Figure 13:
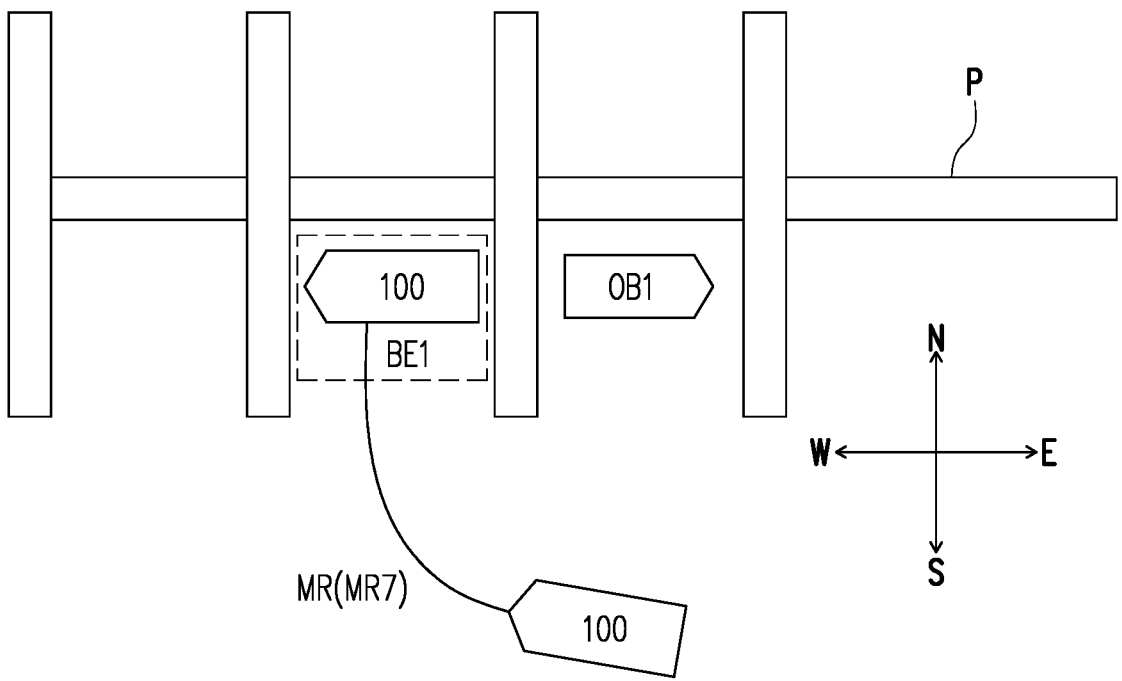
FIG. 13 is a schematic diagram illustrating an H-shape pier wherein a boat is horizontally moored in a second direction according to an embodiment of the disclosure.

FIG. 12 is a schematic diagram illustrating an H-shape pier wherein a boat is horizontally moored in a first direction according to an embodiment of the disclosure. FIG. 13 is a schematic diagram illustrating an H-shape pier wherein a boat is horizontally moored in a second direction according to an embodiment of the disclosure.

Figure 14:
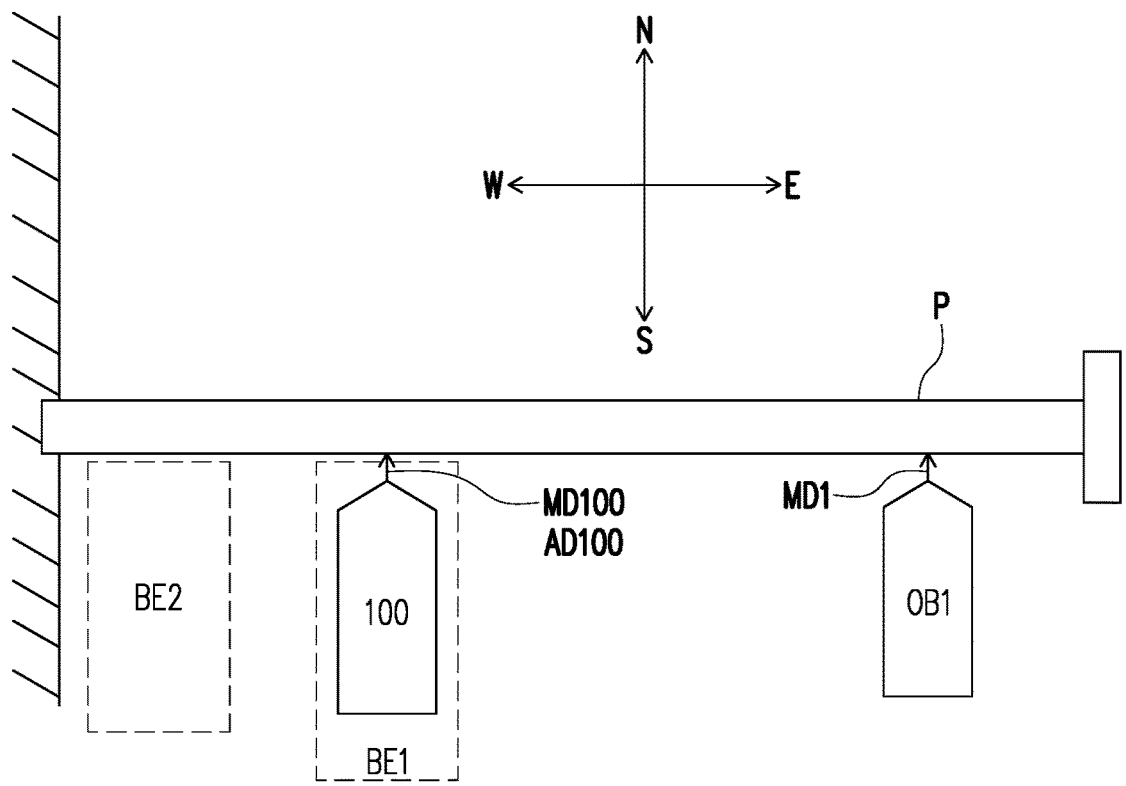
FIG. 14 is a schematic diagram illustrating an I-shape pier wherein a boat is vertically moored in a first direction according to an embodiment of the disclosure.
Figure 15:
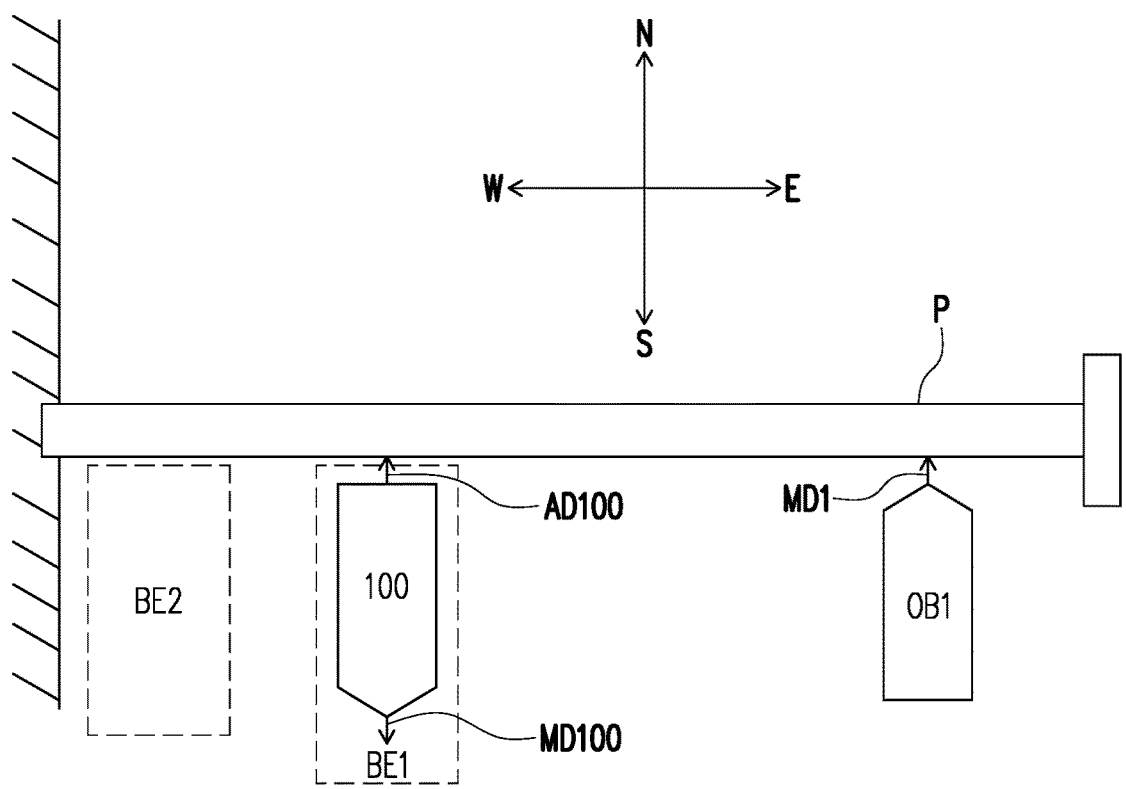
FIG. 15 is a schematic diagram illustrating an I-shape pier wherein a boat is vertically moored in a second direction according to an embodiment of the disclosure.

FIG. 14 is a schematic diagram illustrating an I-shape pier wherein a boat is vertically moored in a first direction according to an embodiment of the disclosure. FIG. 15 is a schematic diagram illustrating an I-shape pier wherein a boat is vertically moored in a second direction according to an embodiment of the disclosure.

As described in the above embodiments, the boat 100 may be vertically moored or horizontally moored with respect to the pier P. More specifically, the boat 100 may be vertically moored or horizontally moored with respect to the horizontal beam extending from the West to East as shown in the figures. Accordingly, the control unit 10 identifies a shape of the pier P based on the image information 20. For example, the control unit 10 may identify if the H-shape pier, the I-shape pier, the horizontal beam extending from the West to East and/or the like. Then, the mooring direction MD100 of the boat 100 or the berth approach direction AD100 of the boat 100 is determined based on the shape of the pier P and the mooring direction MD1 of the other boat OB1.

Furthermore, when the boat 100 is vertically moored to the pier H, the control unit 10 determines the berth approach direction AD100 of the boat 100. When the boat 100 is horizontally moored to the pier H, the control unit may determine the berth approach direction AD100 of the boat 100. The control unit 1 determines the berth approach direction AD100 of the boat 100 as bow (front) first or stern (rear) first.

As described above, the mooring direction M100 of the boat 100, and the second automatic mooring route MR2 of the boat 100 such as shown in FIG. 5 may be displayed on the monitor 15. Furthermore, the berth approach direction AD100 of the boat 100 such as shown in FIG. 10 and FIG. 11 may be displayed on the monitor 15. The mooring direction MD100 of the boat 100, and/or the automatic mooring route MR of the boat 100, and/or the berth approach direction AD100 of the boat 100 may be changed via the input unit.

In another embodiment of the disclosure, the control unit 10 determines the mooring direction MD100 of the boat 100 based on a mooring direction of one of the plurality of other boats having a substantially same size as the boat. For example, if the boat 100 has a length of 20 feet, the control unit 10 may identify an other boat having a substantially same length as the boat 100 from the image information 100. Then, the control unit 10 may set the mooring direction MD 100 of the boat 100 to the same mooring direction as the other boat having a substantially same length as the boat 100.

In another embodiment of the disclosure, the control unit 10 determines the berth approach direction AD100 of the boat 100 based on a mooring direction of one of the plurality of other boats having a substantially same size as the boat. For example, if the boat 100 has a length of 20 feet, the control unit 10 may identify an other boat having a substantially same length as the boat 100 from the image information 100. Then, the control unit 10 may set the berth approach direction AD100 of the boat 100 to the same estimated berth approach direction as the other boat having a substantially same length as the boat 100.

The mooring direction MD100 of the boat 100 may be specified, for example, in degrees from north. North may be, for example, true north or magnetic north. In another embodiment of the disclosure, the mooring direction MD100 of the boat 100 may be specified, for example, in cardinal directions. However, the disclosure is not limited hereto. The above are examples only, and the mooring direction MD100 of the boat 100 and the mooring direction MD1 of the other boat OB1 may be specified in other ways according to requirements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system, for automatically determining a mooring direction or a berth approach direction of a boat, the system comprising:
   a control unit, comprising a processor, configured to:
      obtain image information, the image information including information of an other boat that is moored;
      identify a mooring direction of the other boat based on the image information; and
      determine the mooring direction or the berth approach direction of the boat based on the mooring direction of the other boat; and
      output a control signal for controlling an automatic mooring of the boat;
   wherein the control unit determines an automatic mooring route of the boat based on the mooring direction or the berth approach direction of the boat, and the system controls the automatic mooring of the boat using the control signal,
   wherein the control unit is configured to set the mooring direction of the boat to be a same or opposite direction as the mooring direction of the other boat, and the system controls the automatic mooring of the boat using the control signal to moor the boat in the same or opposite direction as the other boat,
   wherein the image information includes information of a plurality of other boats that are moored,
   the control unit determines the mooring direction or the berth approach direction of the boat based on a mooring direction of one of the plurality of other boats having a predetermined length.

2. The system according to claim 1, wherein the control unit determines whether the mooring direction of the boat with respect to a berth is horizontal or vertical.

3. The system according to claim 1, wherein the control unit determines whether the berth approach direction of the boat is bow first or stern first.

4. The system according to claim 1, wherein the image information, including information of the other boat, is obtained from a camera disposed on the boat.

5. The system according to claim 1, wherein the image information, including information of the other boat, is obtained from a satellite image.

6. The system according to claim 1, wherein the image information, including information of the other boat, is obtained from an aerial drone.

7. The system according to claim 1, wherein the image information, including information of the other boat, is obtained from an underwater drone.

8. The system according to claim 1, wherein the image information, including information of the other boat, is obtained from a lidar.

9. The system according to claim 1, wherein the mooring direction of the other boat is determined based on bow information of the other boat.

10. The system according to claim 1, wherein the mooring direction of the other boat is determined based on a location of an outboard of the other boat.

11. The system according to claim 1, wherein the mooring direction of the other boat is determined based on a cabin shape of the other boat.

12. The system according to claim 1, further comprising:
    a display unit, comprising a display,
    wherein the mooring direction or the berth approach direction of the boat, and the automatic mooring route of the boat are displayed on the display unit.

13. The system according to claim 12, further comprising:
    an input unit,
    wherein at least one of the mooring direction of the boat, the berth approach direction of the boat, or the automatic mooring route of the boat is changed via the input unit.

14. The system according to claim 1, wherein the image information is image information that is obtained in real time or image information that is stored in a memory.

* * * * *